Figure 2C:
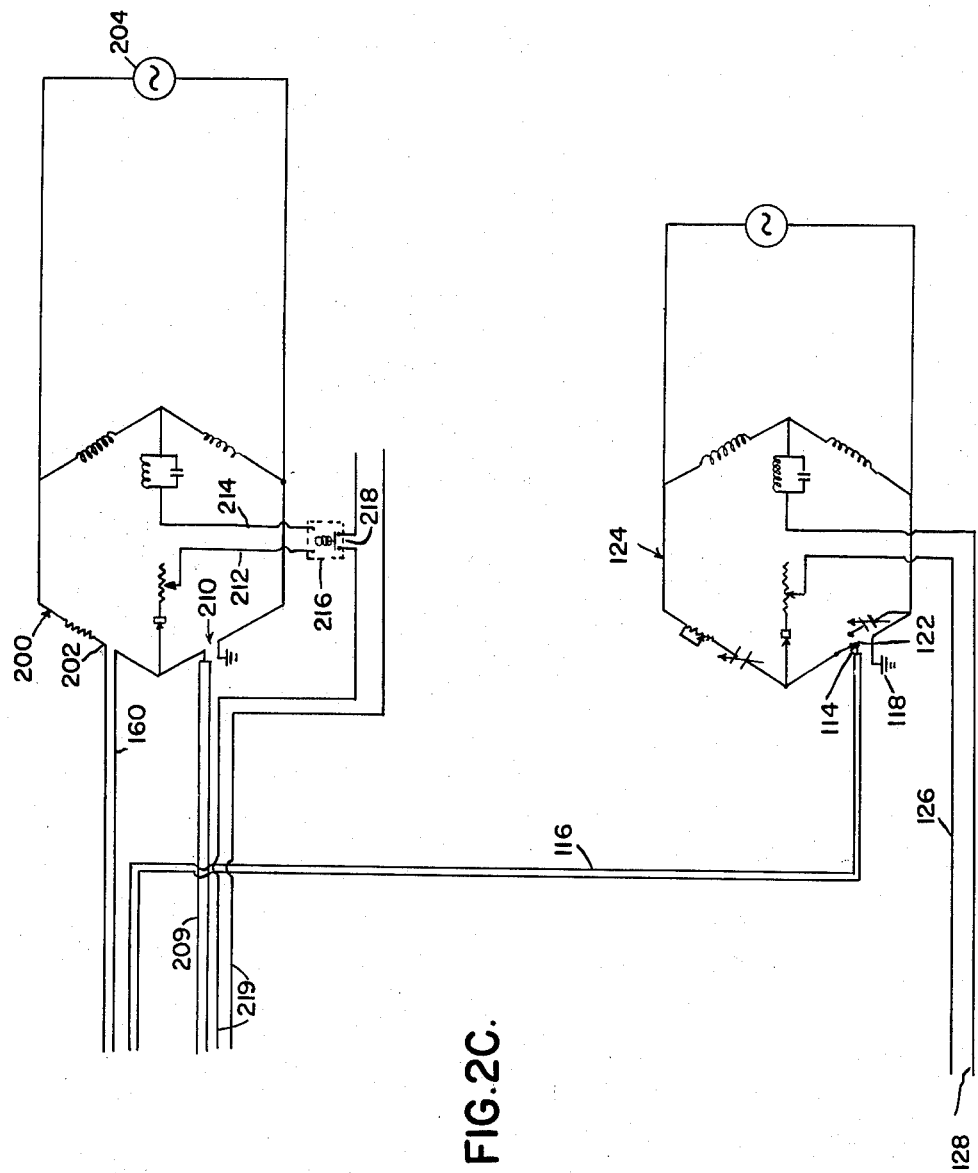

Aug. 19, 1958  H. W. DIETERT ET AL  2,848,008
APPARATUS FOR MEASURING, RECORDING AND/OR CONTROLLING
THE MOISTURE CONTENT OF BULK MATERIAL
Filed Dec. 14, 1953  6 Sheets-Sheet 1
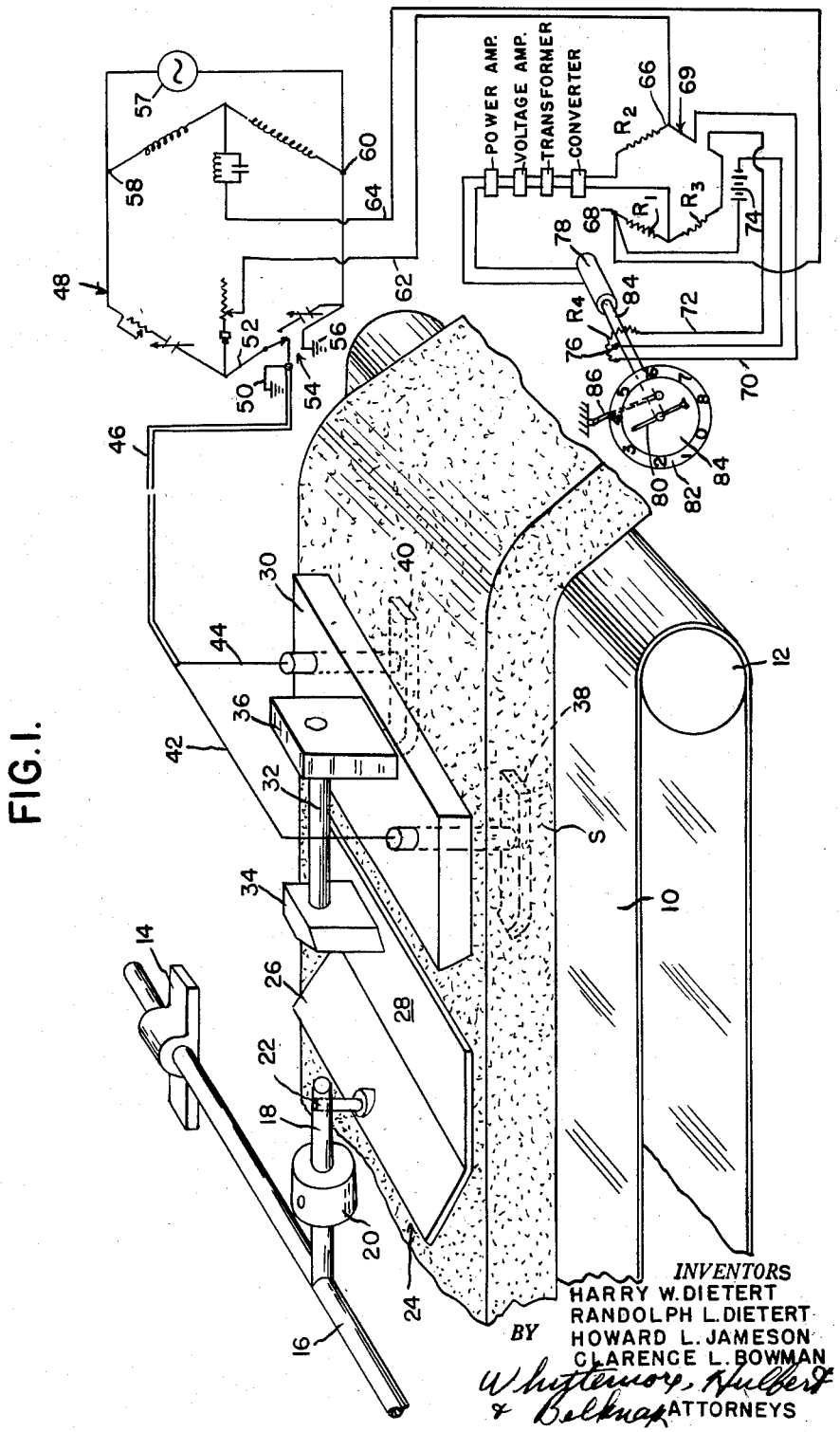
FIG.I.
INVENTORS
HARRY W. DIETERT
RANDOLPH L. DIETERT
BY HOWARD L. JAMESON
CLARENCE L. BOWMAN
ATTORNEYS

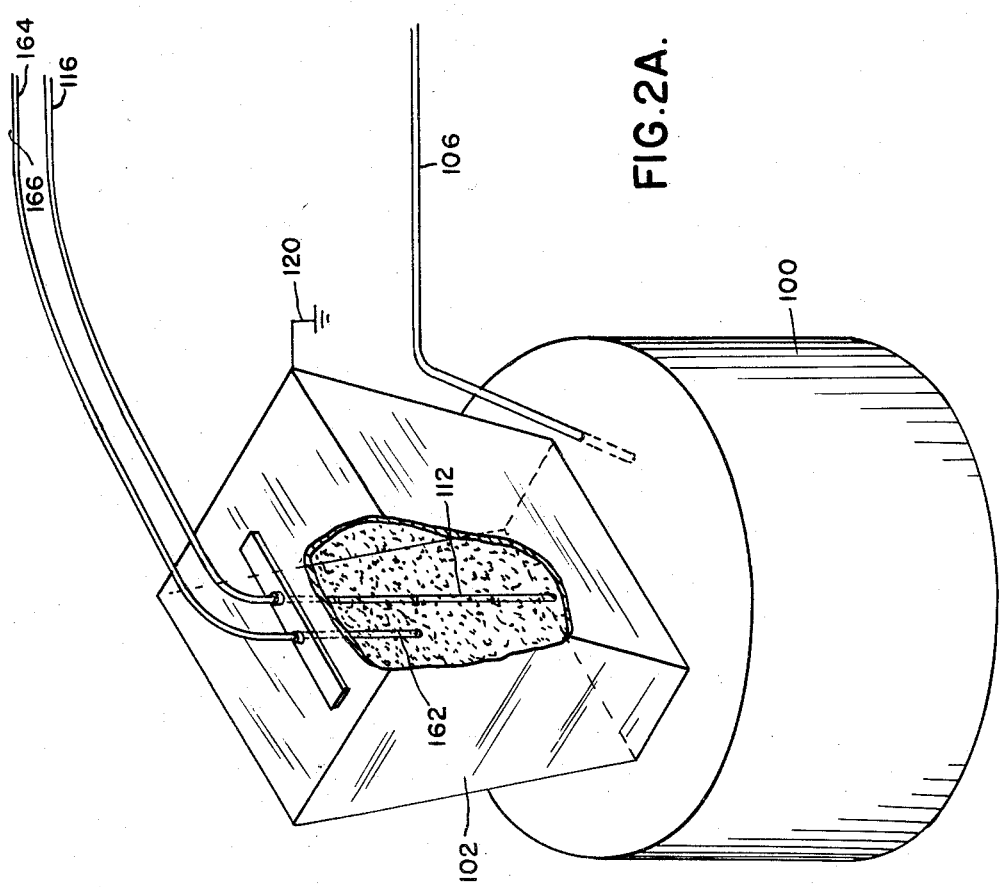

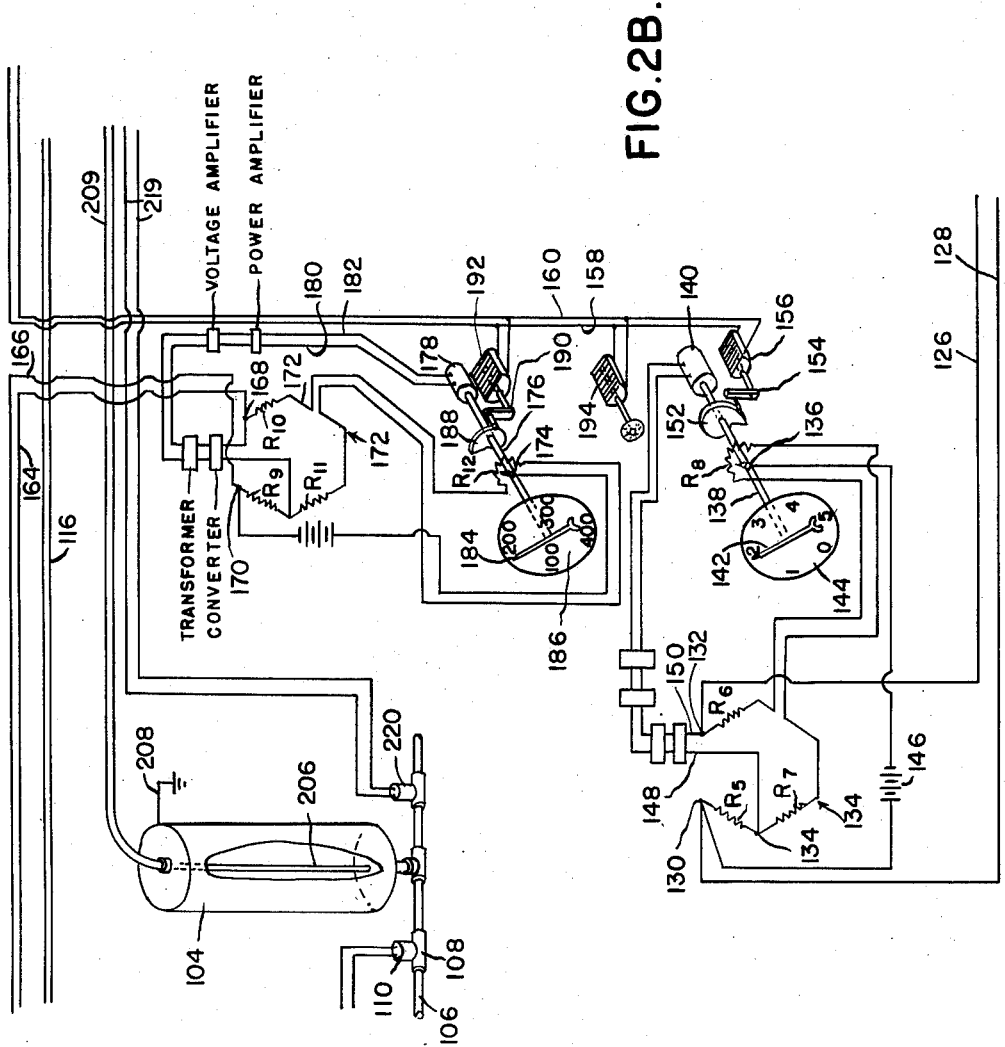

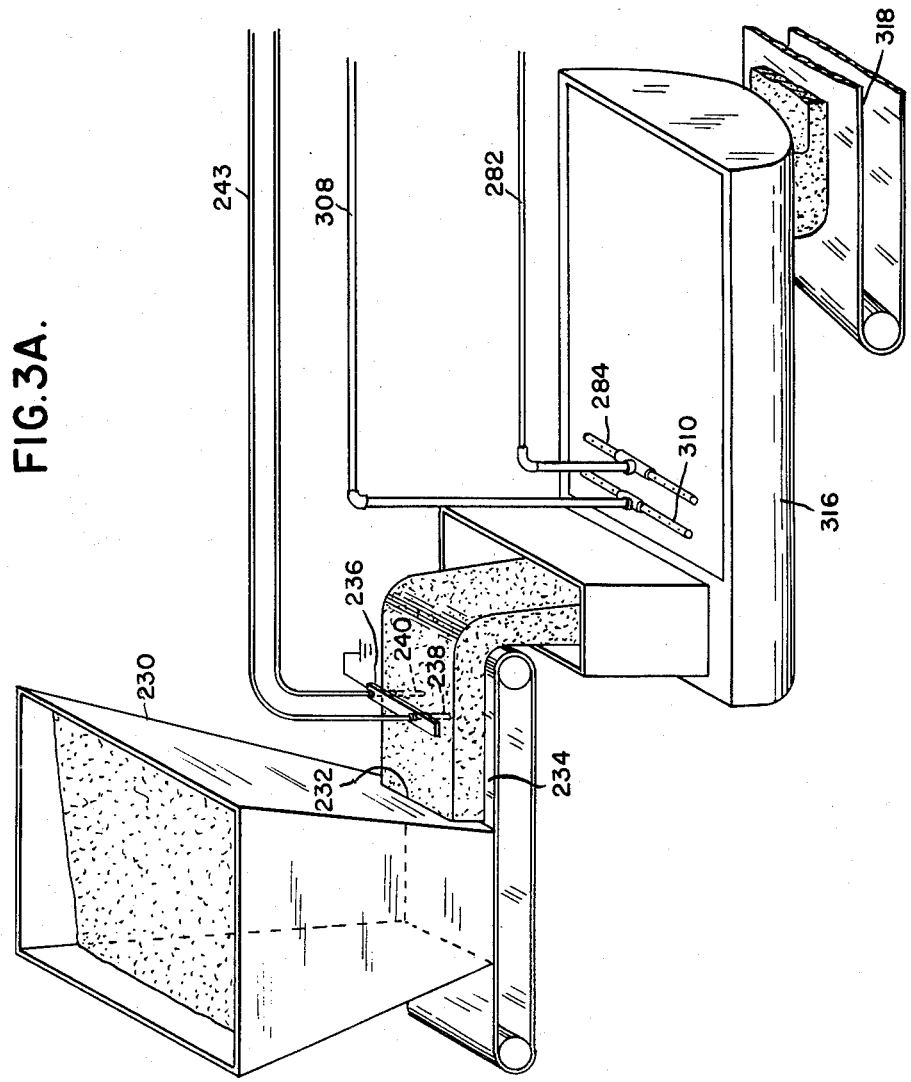

Aug. 19, 1958     H. W. DIETERT ET AL     2,848,008
APPARATUS FOR MEASURING, RECORDING AND/OR CONTROLLING
THE MOISTURE CONTENT OF BULK MATERIAL
Filed Dec. 14, 1953     6 Sheets-Sheet 6

FIG.3B.

INVENTORS
HARRY W. DIETERT
RANDOLPH L. DIETERT
BY   HOWARD L. JAMESON
CLARENCE L. BOWMAN

Whittemore, Hulbert
& Belknap   ATTORNEYS

United States Patent Office 2,848,008
Patented Aug. 19, 1958

2,848,008

APPARATUS FOR MEASURING, RECORDING, AND/OR CONTROLLING THE MOISTURE CONTENT OF BULK MATERIAL

Harry W. Dietert, Randolph L. Dietert, Howard L. Jameson, and Clarence L. Bowman, Detroit, Mich., assignors to Harry W. Dietert Company, Detroit, Mich., a corporation of Michigan Application December 14, 1953, Serial No. 398,022

10 Claims. (Cl. 137—90)

The present invention relates to apparatus for measuring, recording and/or controlling the moisture content of bulk material such for example as sand, and more particularly, for controlling the moisture content of sand in accordance with its temperature.

The invention finds its greatest field of utility in foundry practice where it is essential to control the physical condition of the sand, and more particularly, the percentage of moisure in the sand in accordance with its temperature.

It is an object of the present invention to provide apparatus for utilizing an electrical property of moist sand variable in accordance with the percentage moisture thereof to obtain an electrical indication of the moisture content of the sand.

More specifically, it is an object of the present invention to measure the electrical capacity between a pair of conductors or between a conductor and ground, and for using this capacity in an electrical circuit to obtain an indication of the percentage moisture of the sand.

It is a further object of the present invention to provide apparatus including a bridge circuit, means for introducing into one leg of such circuit a capacitance variable in accordance with the percentage moisture content of the specimen, obtaining an output from the bridge circuit also variable in accordance with the percentage moisture content of the specimen, and means including a continuous balance Wheatstone bridge including in one leg thereof a resistance variable in accordance with movement of an indicator whereby for each output form of the bridge circuit, the indicator would reach a definite graduation on a scale.

It is a further object of the present invention to provide apparatus for continuously advancing moist bulk material, a pair of spaced electrodes adapted to be submerged in the bulk material, and electrical means for continuously measuring the capacitance between such electrodes including indicating means graduated in terms of percentage moisture of the bulk material.

It is a further object of the present invention to provide apparatus for controlling the moisture of bulk material including electrical means for measuring the percentage moisture content of the bulk material, a water tank, a valve for admitting water to the tank, control means for the valve responsive to the electrical means for controlling admission of water to the tank and for terminating the admission of water to the tank when a quantity sufficient to produce the required percentage moisture content of the bulk material has been reached.

It is a further object of the present invention to provide apparatus for continuously advancing bulk material, electrical means for measuring the percentage moisture content of the bulk material, means for adding water to the bulk material as it advances, and means responsive to the electrical means for controlling the quantity of water to be admitted to the bulk material so as to produce the required percentage moisture content thereof.

Other objects and features of the invention will become apparent as the description proceeds, especially when taken in conjunction with the accompanying drawings, wherein:

Figure 1 is a combined diagrammatic view and wiring diagram showing means for measuring and recording the percentage moisture content of bulk material.

Figures 2A, 2B and 2C together are a combined diagrammatic view and wiring and hydraulic diagram showing apparatus for controlling the moisture content of bulk material.

Figures 3A and 3B together are a combined diagrammatic view and wiring and hydraulic diagram showing apparatus for controlling the moisture content of continuously advancing bulk material.

Referring now to Figure 1 there is illustrated a conveyor belt 10 advancing over rollers one of which is indicated at 12, and having thereon a continuous supply of moist bulk material such as the sand indicated at S. Located above the conveyor belt 10 is a support comprising brackets 14 carrying a pivot rod 16 to which is secured a bar 18 having a slidable weight 20 mounted thereon. At the free end of the rod 16 there is provided an opening for receiving a pin 22 projecting upwardly from a smoothing device 24 having an upwardly inclined flat portion 26 and a horizontally extending flat portion 28. The purpose of the smoothing device is to smooth the upper surface of the bulk material. Resting upon the upper surface of the sand is a sled 30 connected to the flat portion 28 by a bar 32 the ends of which are secured in a block 34 extending upwardly from the plate or flat portion 28 and a block 36 extending upwardly from the sled 30. Extending downwardly from the sled 30 are a pair of electrodes 38 and 40. These electrodes are spaced apart a predetermined distance in the sand or other bulk material and accordingly, there is an electrical capacitance between these electrodes. The electrodes 38 and 40 are connected by conductors 42 and 44 respectively which in turn are the components of a coaxial cable 46 leading to an inductance-capacitance bridge indicated generally at 48. As illustrated, the conductor 44 is grounded as indicated at 50 and the conductor 42 is connected into one leg 52 of the bridge at a gap 54, the other side of the gap being grounded as indicated at 56. High frequency oscillating voltage, as for example 300 to 3000 kilocycles, from a power source indicated generally at 57, is connected to the bridge at the terminals 58 and 60. For each value of capacitance between the electrodes 38 and 40 the inductance-capacitance bridge 48 therefore has an output through the lines 62 and 64 variable directly in accordance with the capacitance between the electrodes. It has been found that the capacitance between electrodes is a direct function of moisture content of the bulk material and accordingly, the output of the inductance-capacitance bridge may be regarded as variable directly in accordance with percentage moisture content of the bulk material.

Conductors 62 and 64 from the inductance-capacitance bridge are connected to terminals 66 and 68 respectively of a continuous balance Wheatstone bridge 69 having resistances $R_1$, $R_2$ and $R_3$ in its legs. A fourth resistance $R_4$ is connected into another leg of the Wheatstone bridge 69 by conductors 70 and 72. A constant voltage battery indicated at 74 is provided having one side connected to the terminal 68 and the other side to pointer 76 which is movable over the resistance $R_4$. The resistance $R_4$ is arranged in an arcuate pattern for this purpose. The output of the continuous balance Wheatstone bridge is passed through the converter, transformer, voltage amplifier and power amplifier as designated on the Figure to a motor 78 and this motor will rotate to move a hand 80 of an indicator over a dial 82 graduated in percentage of moisture. Preferably, the indicator is of the type having removable cards 84 and a stylus 86 so as to produce a permanent record of the percentage moisture.

It will be appreciated that as the motor 78 turns it drives the hand 80 through the shaft 84 and the pointer 76 is secured to the shaft 84 for rotation therewith. Accordingly, the motor continues to rotate until the Wheatstone bridge 69 is in balance at which time its output through the converter, transformer, voltage amplifier and power amplifier is zero. So long as the percentage moisture of the sand or other bulk material remains constant, the hand 80 of the indicator will not move. However, when the percentage moisture as determined by the value of the capacitance between the electrodes 38 and 40 varies, the output of the inductance-capacitance bridge 48 will vary and the motor 78 will turn to rebalance the bridge 69.

Referring now to Figures 2A, 2B and 2C there is illustrated an arrangement in which a sand mill 100 has superimposed thereover a hopper 102 adapted to contain a quantity of moist bulk material, such for example as sand. It is contemplated that in use a measured quantity of sand from the hopper 102 will be discharged into the sand mill and worked. Associated with the sand mill is a water tank 104 having an outlet line 106 including a discharge valve 108 adapted to be controlled by a solenoid or the like, as indicated at 110, to discharge water from the tank 104 into the sand mill 100 when the sand from the hopper 102 is discharged into the sand mill.

Carried by the hopper 102 is a moisture probe 112 connected by a conductor 114 received in a coaxial cable 116. The coaxial cable is grounded as indicated at 118 and the wall of the hopper 102 is grounded as indicated at 120. Accordingly, the capacitance of the moist sand or other bulk material between the probe 112 and a wall of the hopper is applied by the conductor 114 to the gap 122 in the inductance-capacitance bridge 124. The inductance-capacitance bridge 124 accordingly has a variable output through the conductors 126 and 128 which is variable in accordance with the capacitance between the probe 112 and the wall of the hopper 102, or which in other words, is variable in accordance with the percentage moisture content of the bulk material in the hopper. The output of the inductance-capacitance bridge 124 is connected to the terminals 130 and 132 of a continuous balance Wheatstone bridge indicated at 134 and including resistances $R_5$, $R_6$ and $R_7$. A fourth resistance $R_8$ is provided in the form of a rheostat or potentiometer including a wiper 136 carried by the shaft 138 of a motor 140. The shaft 138 also carries the hand 142 of an indicator movable over a dial 144 graduated in terms of percentage moisture.

A constant voltage battery 146 is connected between the terminal 130 and the wiper 136. The output of the continuous balance Wheatstone bridge 134 is through conductors 148 and 150 through the converter, transformer, voltage amplifier and power amplifier indicated on the drawing to the motor 140. Accordingly, for each given output of the bridge 124, the motor 140 turns to a position such that the Wheatstone bridge 134 is balanced, this being accompanied by rotation of the hand 142 over the dial 144. At the same time the motor shaft 138 carries a cam 152 which operates on a crank 154 of a variable plate condenser 156 connected into a capacitance line formed by the conductors 158 and 160. The cam 152 since it is operated in accordance with moisture in the bulk material, is referred to herein as a moisture cam.

Also carried in position to be immersed in the moist sand in the hopper 102 is a thermocouple 162 connected by conductors 164 and 166 to terminals 168 and 170 respectively of a bridge 172. The bridge contains resistance $R_9$, $R_{10}$, and $R_{11}$, and a fourth resistance $R_{12}$ is provided in the form of a rheostat having associated therewith a wiper 174 carried by the shaft 176 of a motor 178. The output of the bridge 172 is through the converter, transformer, voltage amplifier and power amplifier identified on the drawing through lines 180 and 172 to the motor 178. Accordingly, as the temperature of the bulk material in the hopper varies there is a variable output from the bridge 172 which varies in accordance with the temperature and this output produces rotation of the motor 178 until the bridge 172 is balanced. The shaft 176 carries a hand 184 movable over a dial 186 graduated in degrees Fahrenheit. Also carried by the motor shaft 176 is a cam 188 operating through a crank 190 which actuates a variable plate condenser 192 connected in parallel to the condenser 156 in the capacitance line formed by the lines 158 and 160.

A third variable plate condenser 194 is provided also connected in parallel to the condensers 156 and 192, and into the capacitance line formed by the conductors 158 and 160 for the purpose of balancing the circuit. The capacitance line 158, 160 is connected into an inductance-capacitance bridge 200 as indicated at 202, this bridge being connected to a source of high frequency oscillating voltage, as for Example 300 to 2000 kilocycles, the source of power being indicated at 204.

Also connected into the bridge is the capacitance established between a water measuring probe 206 and the wall of the tank 104, the latter being grounded as indicated at 208. The capacitance between the probe 206 and the wall of the tank is variable in accordance with the quantity of water in the tank and this variable capacitance is introduced into the inductance-capacitance bridge as indicated at 210. Output of the inductance-capacitance bridge 200 is through lines 212 and 214 to a relay 216 controlling a switch 218 which is adapted to be opened when the bridge circuit is in balance. This takes place when the quantity of water is just sufficient to provide the necessary amount of moisture to bring the percentage moisture content of the sand within the hopper 102 to the required amount. At this time opening of the switch 218 operates to close an inlet valve 220 which controls the flow of water into the tank 104.

Referring now to Figures 3A and 3B there is shown a sand bin 230 containing a quantity of moist sand adapted to be fed through an opening 232 in the bin onto the top of an advancing grounded conducting conveyor belt 234. Mounted above the sand on the conveyor belt is a support 236 carrying a moisture probe 238 and a thermocouple probe 240 in position to be buried or immersed in the sand as it is advanced by the conveyor belt. The moisture probe 238 is connected to a conductor 242 of a coaxial cable 243 so as to introduce the capacitance between the moisture probe and the conveyor belt into a leg of the inductance-capacitance bridge 244, as indicated at 246. If a non-conducting conveyor belt is used, the moisture probe device may include a second probe element which will be grounded to that capacitance between a pair of probe elements is measured. The inductance-capacitance bridge 244 is connected to a source of high frequency oscillating voltage indicated generally at 248, the frequency being generally between 300 and 2000 kilocycles. The power source is connected to the bridge at the terminals 250 and 252. The output of the bridge 244 is connected by the lines 254 and 256 respectively to the terminals 258 and 260 of a continuous balance Wheatstone bridge 262 having resistances $R_{13}$, $R_{14}$ and $R_{15}$. A fourth resistance $R_{16}$ is provided in the form of a rheostat having associated therewith a wiper 264 carried by the shaft 266 of a motor 268. A constant voltage battery 270 is connected between the terminal 260 of the Wheatstone bridge and the wiper 264. The Wheatstone bridge has an output passing through the converter, transformer, voltage amplifier and power amplifier indicated on the drawing, to the motor 268. Accordingly, as the output of the inductance-capacitance bridge 244 varies the motor 268 is driven in the appropriate direction to rebalance the bridge 262. The shaft 266 carries the hand 272 of an indicator having a dial 274. In addition, the motor shaft 266 is connected to a regulator 276 of an air supply line 278 leading to a proportional valve 280 controlling the flow of water through a line 282. Accordingly, the regulator controls the degree of opening of the valve 280 so as to control the rate of addition of water through the line 282 and a spray head 284.

The thermocouple is connected into a continuous balance Wheatstone bridge indicated at 290 having an output connected through the converter, transformer, voltage amplifier and power amplifier as illustrated, to a motor 292. The Wheatstone bridge 290 includes resistances $R_{17}$, $R_{18}$ and $R_{19}$, and a fourth resistance $R_{20}$ is provided in the form of a rheostat associated with a pointer 294 driven by the shaft 296 of the motor 292. Also carried by the shaft 296 is a hand 298 of an indicator movable over a dial 300 graduated in degrees Fahrenheit.

Also connected to the shaft 296 of the motor 292 is an air regulator 302 controlling the flow of air through a line 304 which in turn controls the degree of opening of a proportional valve 306 in the water line 308. Thus, a quantity of water is allowed to flow through the line 308 and through the spray head 310 which is varied in accordance with the temperature of the sand or other moist material.

In order to obtain accurate control of the flow of water, the water lines include a pressure regulator 312 so that for any particular opening of the proportional valves 280 or 306, a definite quantity of water is allowed to flow therethrough.

The sand is discharged into a continuous sand mixer 316 into which the spray heads 284 and 310 also discharge so that as the sand is mixed in the mixer it has the water received from the spray heads 284 and 310 uniformly mixed therewith.

The mixed sand whose moisture content has been brought to a predetermined degree in accordance with its temperature is discharged from the sand mixer onto a conveyor belt 318 where it is advanced to the point of use.

While a hopper 102 is illustrated in Figure 2A, it will be understood that instead a skip hoist hopper may be used in position to raise a charge of sand and to dump it into the mill. Alternatively, a weigh lorry may be used movable along a trackway to receive sand from elevated storage bins and to dump into the mill. The coaxial cable and thermocouple lead are of course flexible and permit the required movement of the hopper and weigh lorry.

It will be appreciated that wherever an indicating dial is illustrated it may be provided with a recording stylus as illustrated for example in Figure 1. In order to avoid complicating the drawings these recording styluses have not been illustrated except in Figure 1.

From the foregoing it will be seen that the present invention provides means for measuring the moisture content of sand or other bulk material by obtaining a direct reading of an electrical property thereof dependent upon moisture content. More particularly, the electrical property is the capacitance between electrodes separated a predetermined distance by a quantity of the material whose moisture content is to be measured.

In some of the modifications of the invention the indication of the moisture content is used to control the addition of water either by measuring out a predetermined charge of water required to produce the desired change in moisture content or by adding water at a constant rate dependent upon moisture content to produce the desired moisture content.

Preferably, and as illustrated in some of the embodiments of the invention, the temperature of the sand is also measured so that the quantity of water added thereto may be dependent upon its temperature. It is well recognized in the industry that the exact required moisture content of the sand is variable in accordance with its temperature, due to more rapid loss of moisture at elevated temperature during processing and/or storage.

The drawings and the foregoing specification constitute a description of the improved apparatus for measuring, recording and/or controlling the moisture content of bulk material in such full, clear, concise and exact terms as to enable any person skilled in the art to practice the invention, the scope of which is indicated by the appended claims.

What we claim as our invention is:

1. Moisture control apparatus comprising a batch mill, a hopper disposed to empty into said mill, a liquid tank having an inlet valve controlling admission of liquid to said tank, a liquid connection between said tank and said mill, a discharge valve in said connection controlling flow of liquid from said tank to said mill, a probe insertable in bulk material in said hopper, an electrical measuring circuit connected to said probe having an electrical output dependent on the percentage of moisture in bulk material in said hopper, an electrical measuring circuit having an electrical output dependent on the quantity of liquid in said tank, electrical inlet valve control means comprising a circuit connected to receive the outputs from said measuring circuits and responsive to the percentage moisture in said bulk material and to the quantity of liquid in said tank effective to close said inlet valve when the quantity of liquid in said tank is sufficient to produce a predetermined percentage of moisture in the bulk material when added thereto.

2. Apparatus as defined in claim 1 which comprises means for discharging the liquid in said tank and the bulk material in said hopper into said mill for mixing.

3. Apparatus as defined in claim 1 which comprises an electrical temperature measuring circuit for measuring the temperature of the bulk material in said hopper and having an electrical output dependent on temperature of the bulk material, and in which said valve control means is also connected to receive the output from said temperature measuring circuit to vary the quantity of liquid in said tank in accordance with such temperature.

4. Apparatus as defined in claim 3 in which said valve control means comprises a bridge circuit having one leg including a capacitance dependent jointly on the percentage of moisture and temperature of said bulk material, and another leg including a capacitance dependent on quantity of water in said tank, and a bridge controlled relay operatively connected to said inlet valve.

5. Apparatus of the class described comprising first means for measuring the moisture content of a predetermined quantity of bulk material, a liquid tank, second means for measuring the quantity of liquid therein, a valve for controlling admission of liquid to said tank, and valve control means responsive jointly to the moisture content of the material and the quantity of liquid in the tank for opening the valve and holding it open until the quantity of liquid in the tank is just sufficient to increase the moisture content of the material to a desired content, said first means comprising a first bridge circuit having an output variable in accordance with moisture content of the material, a second bridge circuit connected to receive the output of said first bridge circuit, bridge balancing means including a motor connected to receive the output of said second bridge circuit and adapted to balance said second bridge circuit, a third bridge circuit having in one leg thereof a device of a variable electrical property, said device being connected to said motor for adjustment thereby to a value dependent on the moisture content of said material, the said second means comprising means for introducing into another leg of said third bridge circuit an electrical value dependent on the quantity of liquid in said tank, the said valve control means comprising a solenoid connected to receive the output of said third bridge circuit.

6. The combination with a sand hopper of a probe therein, an electrical connection to said probe to convey a first electrical property variable in accordance with the moisture content of the sand to a remote station, a thermocouple in said hopper having an electrical connection to convey a voltage variable with temperature of the sand to said station, a mill in position to receive sand from said hopper, a water tank having an outlet for delivering water to sand in said mill, a probe in the tank having an electrical connection to convey a second electrical property variable in accordance with the amount of water in the tank to said station, a water pipe leading to the tank, a water supply valve in the pipe having an electrically operative control means, an operating circuit for said control means comprising a balancing circuit including balance elements variable in accordance with said variable voltage and said electrical properties to close said valve when the proper amount of water has accumulated in said tank as determined by the initial moisture content and temperature of the sand to produce properly tempered sand when added thereto.

7. Apparatus for conditioning foundry sand comprising a container for a measured quantity of sand, a probe for determining the electrical capacity of sand in said container, a thermocouple for establishing a voltage dependent on its temperature, a water tank for receiving a measured quantity of water just sufficient to condition the measured quantity of sand, an inlet valve for said tank, a solenoid for controlling said valve, a bridge circuit having elements therein having variable electrical characteristics variable in accordance with the electrical capacity of the sand, the variable voltage and the quantity of water in said tank, said solenoid having an energizing circuit including a relay connected to the output of said bridge circuit.

8. Apparatus as defined in claim 7 in which the variable electrical characteristics of said elements are all electrical capacity.

9. Apparatus as defined in claim 8 in which the element whose electrical characteristic is variable in accordance with the quantity of water in the tank comprises an elongated probe spaced from the side of the tank and immersed in water as the tank is filled.

10. Apparatus as defined in claim 8 in which the elements whose characteristics are variable in accordance with sand temperature and moisture content are variable condensers.

References Cited in the file of this patent

UNITED STATES PATENTS

| | | |
|---|---|---|
| 1,951,035 | Parker | Mar. 13, 1934 |
| 2,016,920 | Fisher | Oct. 8, 1935 |
| 2,433,599 | Cohen | Dec. 30, 1947 |
| 2,576,253 | Farrell et al. | Nov. 27, 1951 |
| 2,607,828 | Razek | Aug. 19, 1952 |
| 2,615,959 | Spalding | Oct. 28, 1952 |
| 2,655,933 | Odell | Oct. 20, 1953 |
| 2,665,409 | Rogers | Jan. 5, 1954 |
| 2,709,843 | Hartley | June 7, 1955 |